(12) United States Patent  
Pilu

(10) Patent No.: US 7,969,496 B2  
(45) Date of Patent: Jun. 28, 2011

(54) CAMERA IMAGE STABILIZATION METHOD, APPARATUS AND COMPUTER PROGRAM

(75) Inventor: Maurizi Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2515 days.

(21) Appl. No.: 10/426,038

(22) Filed: Apr. 30, 2003

(65) Prior Publication Data

US 2003/0234885 A1 Dec. 25, 2003

(30) Foreign Application Priority Data

Apr. 30, 2002 (GB) .................................. 0209967.9

(51) Int. Cl.  
*H04N 5/222* (2006.01)
(52) U.S. Cl. ............................. 348/333.02; 348/208.99
(58) Field of Classification Search ............. 348/333.02, 348/208.99; 396/55  
See application file for complete search history.

(56) References Cited

U.S. PATENT DOCUMENTS

| 4,959,725 A | | 9/1990 | Mandle ........................ 358/222 |
| 5,335,042 A | * | 8/1994 | Imafuji et al. .................. 396/55 |
| 6,429,895 B1 | * | 8/2002 | Onuki ...................... 348/208.99 |
| 6,614,994 B2 | * | 9/2003 | Ohishi et al. .................... 396/55 |
| 2002/0180876 A1 | * | 12/2002 | Sobol ............................ 348/296 |

FOREIGN PATENT DOCUMENTS

JP 10-148859 6/1998

OTHER PUBLICATIONS

Clarkson et al., "Unsupervised Clustering of Ambulatory Audio and Video", Perceptual Computing, MIT Media Lab.  
Oshima et al., "VHS Camcorder with Electronic Image Stabilizer", IEEE Transactions on Consumer Electronics, vol. 35, No. 4, Nov. 1989, pp. 749-758.  
Tucker et al., "Image Stabilization for a Camera on a Moving Platform", IEEE Pac Rim '93, pp. 734-737.

* cited by examiner

*Primary Examiner* — Gevell Selby

(57) ABSTRACT

A camera comprises a user interface for the input of information indicative of the activity of a user. A control unit controls at least one function of the camera in response to the information.

12 Claims, 4 Drawing Sheets

CAMERA IMAGE STABILIZATION METHOD, APPARATUS AND COMPUTER PROGRAM

FIELD OF THE INVENTION

The present invention relates to methods, apparatus and computer programs suitable for camera image stabilization.

BACKGROUND TO THE INVENTION

A variety of digital and analogue cameras exist for capturing images in a number of formats including still picture images, sequences of still picture images and video image sequences.

The quality of an image is easily affected by movement of the camera while the image is being collected, i.e., captured. Modern cameras, such as video cameras, now feature motion stabilization so as to produce a steady video image in spite of any user handshake or other vibrational disturbances. This improves the quality of the captured image.

For instance, U.S. Pat. No. 4,959,725 describes a method of and apparatus for processing an image captured by a video camera so as to identify undesired video image motion caused by camera motion (rotation or translation), and to subsequently generate a corrected signal in which the undesired image motion is reduced.

It is known that different stabilization techniques are needed to compensate for different types of motion. Modern cameras incorporate motion detection sensors to determine the type of motion a camera experiences (e.g. sudden acceleration or deceleration, or the camera slowly panning across a view). The cameras apply the appropriate motion compensation technique automatically based on a derived measured camera motion, and whether the motion is determined to be deliberate or not.

Also known in the art are cameras that act as situation-based selective video recording systems. For instance, the article "Unsupervised clustering of ambulatory audio and video" by Brian Clarkson and Alex Pentland, Technical Report 471, MIT Media Lab, Perceptual Computing Group, describes a camera, including a wearable computer system, arranged to record the day to day activities of a user. The article describes the development of a system for extracting events and scenes from the audio/visional input of the camera, so that the camera images can easily be indexed.

Preferred embodiments of the present invention aim to obviate or overcome a problem associated with the prior art, whether referred to herein or otherwise.

SUMMARY OF THE INVENTION

In a first aspect, the present invention provides a camera comprising a user interface for the input of information indicative of the activity of a user; and a control unit arranged to control at least one function of the camera in dependence upon said information.

Preferably, said user interface comprises a user selection unit for the manual selection of at least one activity from a predetermined group of activities.

Preferably, said control unit is arranged to store said information with at least one image captured by the camera for subsequent processing.

Preferably, said function comprises an image stabilisation mode of the camera.

Preferably, said function comprises an image capture mode of the camera.

Preferably said information is utilised to determine what images will be captured and subsequently stored by the camera.

Preferably, said information is indicative of at least one of the type of motion likely to be undergone by the user; the type of motion likely to be undergone by the camera; the attention of the user; the behaviour of the user; and the surrounding environment.

Preferably, said camera further comprises a user activity determination unit for estimating the activity of a user. The camera utilizes the estimated activity if, for a predetermined interval, said estimated activity differs from the activity indicated by the user input information.

Preferably, said camera is a wearable camera.

In a further aspect, the present invention provides a user interface for a camera. The user interface inputs information indicative of the activity of a user, for the subsequent control of at least one function of the camera as a function of said information.

In another aspect, the present invention provides a camera comprising a control unit arranged to control at least one function of the camera in dependence upon information indicative of the activity of a user input from a user interface.

A further aspect of the invention relates to a camera comprising a user interface for the input of information indicative of at least one of the motion of the user and the motion of the camera. The camera includes a control unit arranged to control at least one function of the camera in dependence upon said information.

In a further aspect, the present invention provides a method of controlling a camera comprising the steps of: receiving information from a user indicative of the activity of the user. At least one function of the camera is controlled as a function of the information.

Preferably the user activity is selected from a predetermined group of activities. Each activity in said group is associated with at least one predetermined parameter. The method comprises the step of controlling said function by utilising said parameter associated with the user selected activity.

In another aspect, the present invention provides a program arranged to perform the above method.

In a further aspect, the present invention provides a machine readable medium comprising the program.

BRIEF DESCRIPTION OF THE DRAWING

For a better understanding of the invention, and to show how embodiments of the same may be carried into effect, reference will now be made, by way of example, to the accompanying diagrammatic drawings in which.

DETAILED DESCRIPTION OF THE DRAWING

Figure 1:
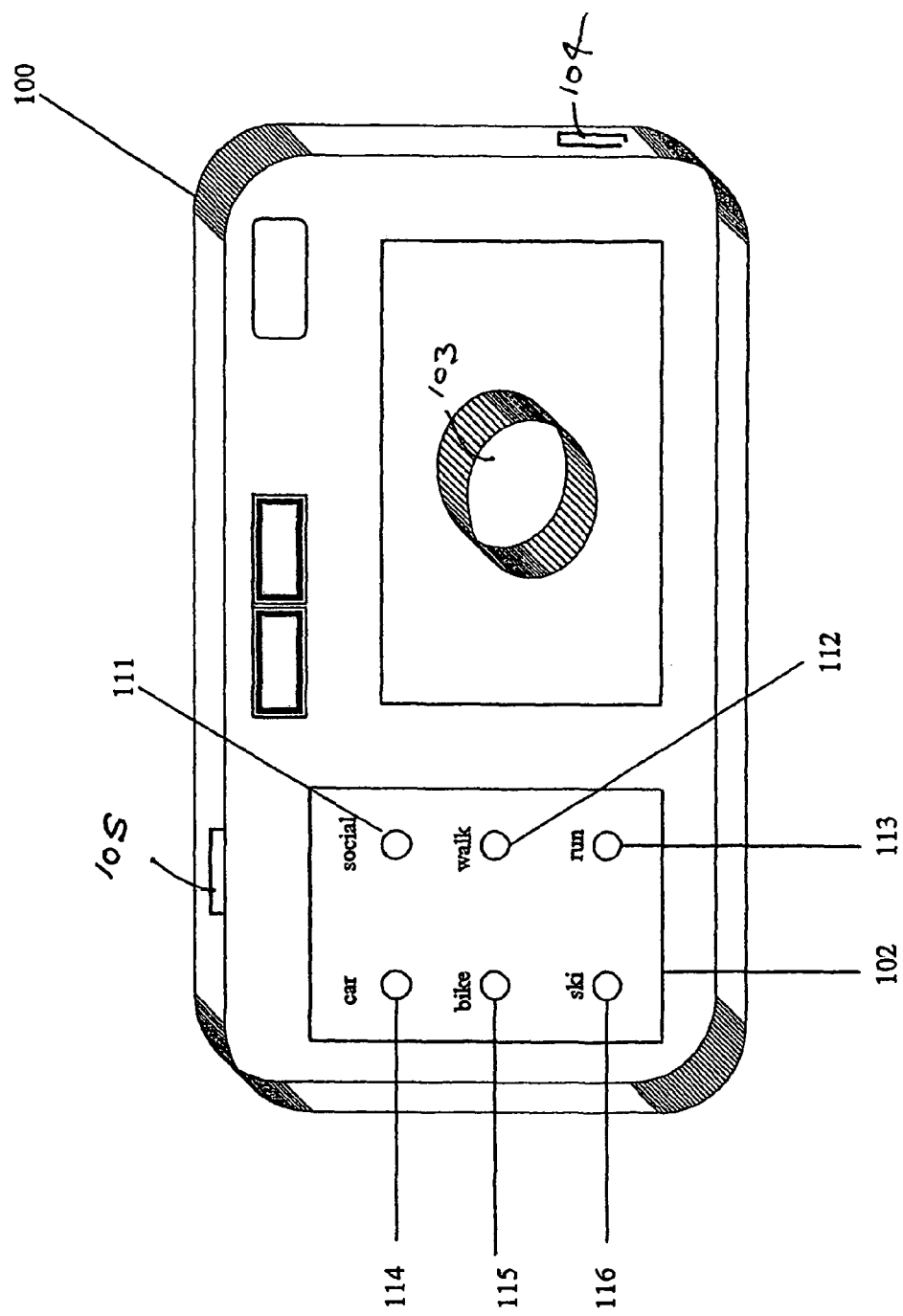
FIG. 1 is a perspective view of a camera according to a preferred embodiment of the present invention.

FIG. 1 is a perspective view of a digital camera 100 that comprises a user interface 102, lens 103, slot 104 for receiving an image memory card, and shutter release button 105, as well as a strap (not shown) suitable for attaching the camera to a body part of a user e.g. the user's head.

The user interface 102 comprises six buttons 111-116. Each of buttons 111-116 corresponds to a different potential activity of the user i.e. socializing button 111, walking button 112, running button 113, travelling on or in a motorized vehicle such as an automotive vehicle button 114, riding a bicycle button 115 and skiing button 116. The user selects the type of activity which he or she intends to undergo by pressing the appropriate button.

Figure 2:
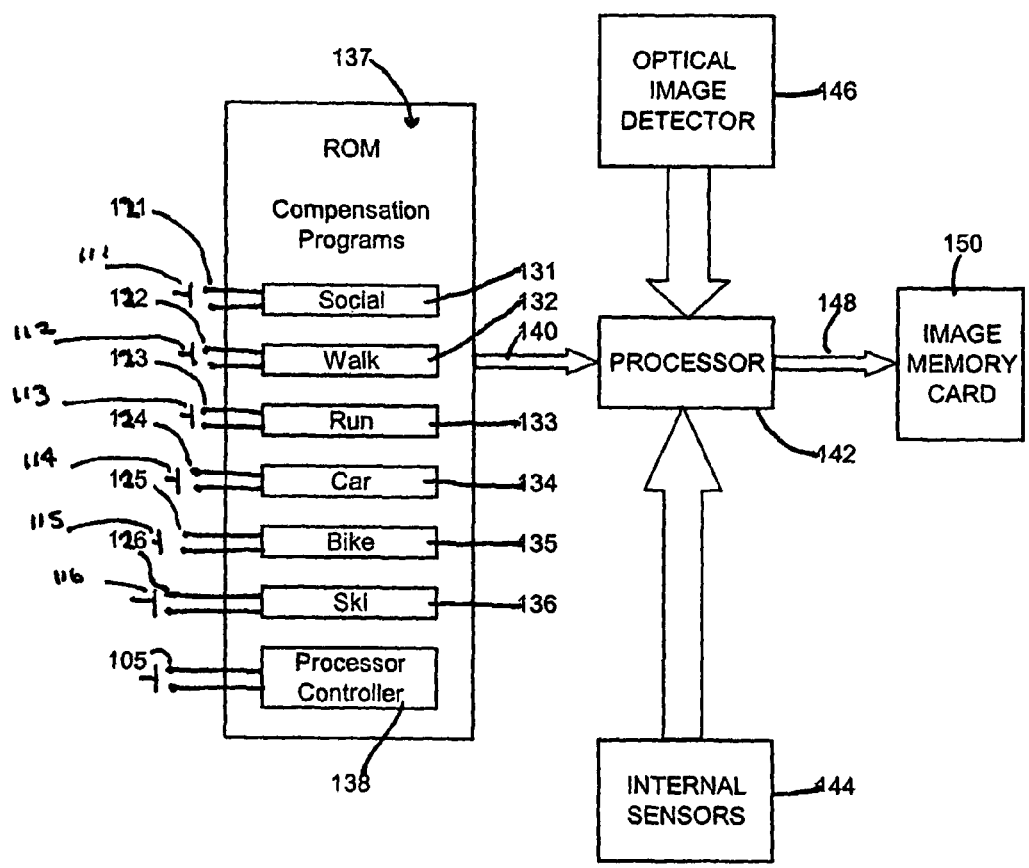
FIG. 2 is a block diagram of electronic circuitry in the camera of FIG. 1.

Reference is now made to FIG. 2 of the drawing, a block diagram of electronic circuitry included within camera 100. The electronic circuitry includes switch contacts 121-126, respectively associated with buttons 111-116, such that in response to one of the buttons being pressed, the associated switch contacts are closed. Each of switch contacts 121-126 is connected to input terminals of read only memory (ROM) 130, which includes compensator programs 131-136, respectively associated with switch contacts 121-126. Compensator programs 131-136 are programs associated with social activities, walking activities, running activities, riding in an automobile activities, biking activities and skiing activities, respectively. ROM 130 also includes processor controller 138 and output bus 140 for supplying signals from compensator programs 131-136 and process controller 138 to digital signal processor 142. Programs 131-136 supply motion compensation signals to processor 142 (typically an application specific integrated circuit (ASIC))via bus 140, under the control of closure of switches 121-126 and processor controller 138, which is activated to supply control signals to bus 140 and processor 142 in response to shutter release button 105 being pressed.

The motion compensation signals that programs 131-136 supply to processor 142 are derived in accordance with the principals set forth in the previously mentioned Tucker and Oshima et al. articles. Processor 142 is also responsive to inertial sensors 144 included in camera 100 and the output of optical image detector 146, included in camera 100 to be responsive to the optical image coupled to the interior of the camera via lens 103, as a result of the shutter (not shown) of camera 100 being open in response to button 105 being pressed. Processor 142 responds to the signals from the selected compensator program 131-136, inertial sensors 144, and optical image detector 146 to produce a digital compensated image representing signal under the control of process controller 138. Processor 142 includes output bus 148 for supplying digital signals representing the compensated image. Processor 142 supplies the compensated image representing signal to image memory card 150 via bus 148. Image memory card 150 is of a conventional type adapted to be inserted into slot 104 of camera 100.

Thus, buttons 111-116 are respectively associated with compensation programs 131-136 of read only memory (ROM) 137, which can be considered part of an electronic image stablization unit located in camera 100. ROM 130 responds to activation of buttons 111-116 to supply (via bus 140) electronic processor 142 with signals from the program 131-136 selected by one of buttons 111-116 and from program 138.

Processor 142 is programmed by the signals on bus 140 to process an image signal that detector 146 supplies to the processor to compensate for the motion of camera 100. The image stabilization unit including processor 142 also includes inertial sensors 144 that measure movement of the camera and acceleration experienced by the camera. Processor 142 combines the signals from sensors 144, detector 146 and on bus 140 to form an image processing unit that determines key features of the image captured by detector 146.

Processor 142 of the image stabilization unit (responsive to the image coupled through lens 103) provides image compensation for the image captured by detector 146 by utilizing parametric dynamic models stored in programs 131-136 and signals that control program 138 stores for determining which image features and sensed movements of the camera are used for stabilization, and to what degree. The activity setting inputs of switches 111-116 by the user are associated with entries in programs 131-136 that can be considered tables of parameters that are used by the stabilization unit. The tables ensure that processor 142 uses stabilization techniques and parameters for the particular activity. Hence, different stabilizations are used for the different activities associated with switches 111-116. Processor 142 supplies a signal indicative of the stabilized image (via bus 148) to image memory card 150 of the type typically loaded in a digital camera.

For instance, wearable camera 100 mounted on a helmet while skiing is stabilized by processor 142 in response to the signals from programs 136 and 138, sensors 144 and detector 146. The stabilization is with respect to the ski track, and ignores the skier head motion and trees in the signal that detector 146 derives. Similarly, processor 142 in camera 100 mounted on a helmet of a person in a motor vehicle responds to switch 114, sensors 144 and detector 146 to ignore acceleration-induced head motion and stabilize the motion only with respect to the car. When camera 100 is located on a person in a social situation such as at a party, activation of button 111 causes program 131 to supply processor 142 with a signal that takes into account the focus of interest of the user (e.g. observing a fellow partygoer) so as to adequately record the desired still picture and/or video sequence signal that camera 100 supplies to memory card 150. It will be appreciated that these techniques relating to stabilization are provided by way of example only, and that other stabilization techniques can be utilized as appropriate depending on the activity input by the user.

The problem of image stabilisation has been known for a long time, and many algorithms and apparatuses have been devised to address this problem. Prior art solutions have utilized automatic motion detection. However, automatic motion detection is prone to errors, unpredictable behaviours and requires extra processing power and/or hardware, to provide adequate image compensation in a wide variety of situations. By providing user interface 102 that employs manual settings of user activity, the motion compensation that processor 142 provides can be optimized for the particular motion types likely to be experienced during that activity. The image stabilization techniques can thus be inexpensively and easily optimized, making best use of the available information that can be detected by the camera.

Figure 3:
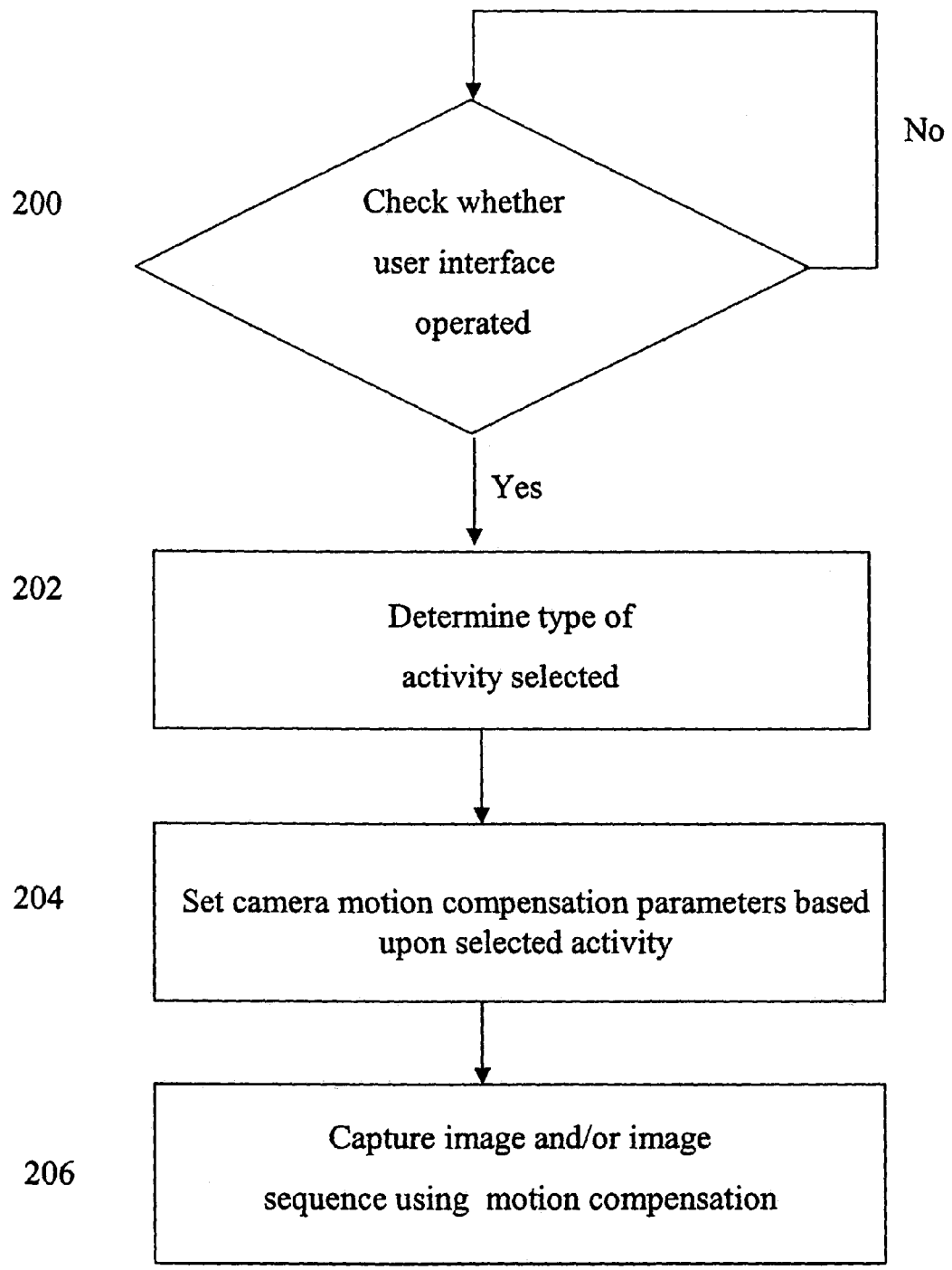
FIG. 3 is a flow diagram of steps involved in operating the camera of FIG. 1.

FIG. 3 is a flow diagram of the steps control program 138 causes processor 142 of camera 100 (having user interface 102) to perform in response to operation of shutter release button 105. Firstly, program 138 causes processor 142 to make a check, by reading the signal on bus 140 to determine whether user interface 102 has been operated (operation 200).

Once processor 142 determines that the user interface has been operated, program 138 activates processor 142 by reading bus 140 to determine the type of activity selected i.e. which one of buttons 111-116 has been pressed (operation 202). Subsequently, based upon the determined type of activity, the camera motion processor 142 responds to the signal on bus 140 indicative of the compensation parameters appropriate for the activity as supplied to the processor 142 from the selected program 131-136 of the camera image compensation processing unit. These parameters, in combination with the signals from inertial sensors 144 adjust the operation of processor 142 in processing the image from detector 146 so as to be most appropriate for the selected activity (operation 204).

Subsequently the signal representing the captured image and/or captured image sequences are motion compensated (operation 206) using the selected parameters and then supplied by processor 142 to memory card 150 via bus 148.

Examples of motion compensation using different parameters for different motions are described in the articles J. C. Tucker, A. de San Lazaro, "Image stabilization for a camera on a moving platform", *Proceedings of IEEE Pacific Rim Conference on Communications Computers and Signal Processing*, Vol. 2, pp 734-7, May 1993, and in M. Oshima, et al., "VHS Camcorder with Electronic Image Stabilizer", *IEEE Transactions on Consumer Electronics*, vol. 35, no 4, pp 749-758, June 1989. These articles describe how the camera motion can be automatically detected, and then the motion compensation applied.

Because detecting motion automatically can be very unreliable, the manual selection through user interface 102 (as proposed above) puts the user in control of the behavior of camera 100. In cases such as when the user's motion defines the very model of user attention, this is even more important.

It will be appreciated that the above embodiment is provided by way of example only, and that other embodiments fall within the scope of the present invention.

Figure 4:
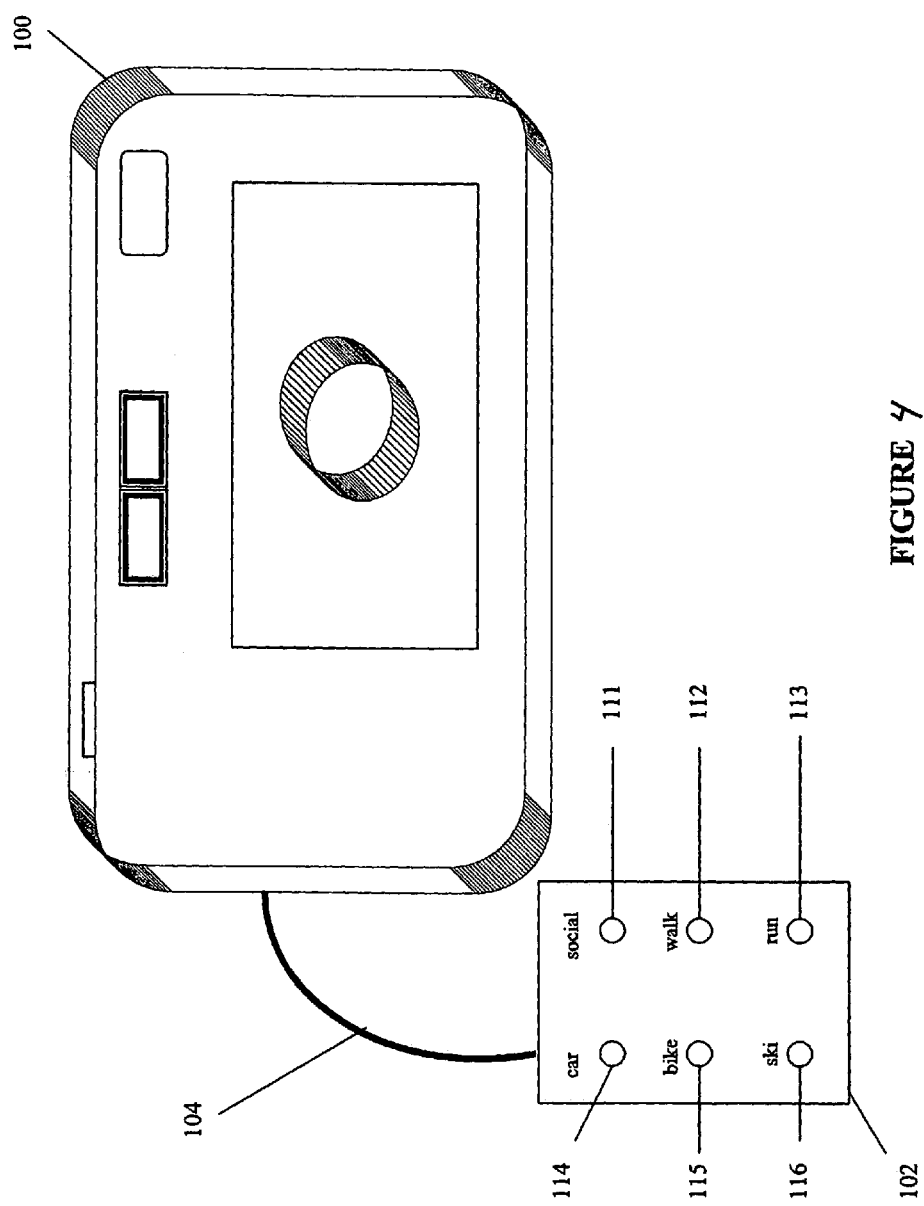
FIG. 4 is a perspective view of a camera with a separate user interface according to an alternative embodiment of the present invention.

For instance, the user interface 102 can be a unit separate from the camera, and arranged to communicate with the camera via an umbilical cord 104 (as shown in FIG. 4) or wireless communication e.g. infrared communication between the camera and the user interface unit.

While the user interface 102 has been indicated as comprising a number of discrete manually operated buttons 111-116, it will be appreciated that a user interface can be implemented with any HCI (Human Computer Interaction) mechanism, such as a graphical user interface, soft buttons, or speech recognition. Such an interface can be pre-programmed with a pre-defined set of activities linked to a pre-defined set of parameters for control of the camera, or any aspect can be controlled and programmed by the user. For instance, the user might alter the parameters associated with the "bike" button 115 so as to provide optimum compensation for the type of bike riding normally undertaken by the user, such as whether the user normally rides on the road or engages in mountain biking.

While the preferred embodiment utilises an in-camera image stabilisation unit to provide motion compensation/image stabilisation for the captured image, the present invention can also be applied to cameras which do not have such on board units. Instead, information indicative of the selected activity can be stored along with the image data. Such information can subsequently be utilised for optimum processing of the image data in a post-capture phase. For instance, a video sequence might be stabilised after capture on another viewing apparatus (e.g. use of a personal computer) according to an activity setting input by the user around the time the image was captured.

In the preferred embodiment, user interface 102 is utilised to input information indicative of the activity of the user, and hence the type of motion of the user. Equally however, a user interface could be utilised to input information on the activity of the user indicative of the behaviour of the user, the likely attention of the user or the environment surrounding the user, or to otherwise set the context in which the camera is expected to operate. Such information can be utilised by the camera to control other functions besides image stabilisation. For instance, a camera arranged to be worn by the user and act as a memory aid, could use the information to determine which images (still pictures, sequences of pictures and/or video sequences) should be captured or indexed.

Such a memory aid camera might have a user interface defining user activities such as "shopping", "commuting", "working" and "at a party". When the "party" activity is selected, such a camera would be arranged to automatically capture and/or index images on which the user appears to focus for a relatively long period of time. This is likely to result in the capture and/or indexing of images of people whom the user would like to remember.

Alternatively, if the user selects the "working" activity by pressing an apparatus "work" button (not shown) on camera 100, program 138 responds to the pressed work button to cause camera 100 to automatically capture and/or index images only when the majority of the scene changes.

This ensures that images are not captured and/or indexed when the user is sitting and continuously working at a desk. The camera also includes an internal clock that is part of processor 142. In response to activation of the "work" button, camera 100 responds to the clock to only capture images during working hours, and not to capture images during other hours e.g. during the lunch interval.

While various examples of activities have been disclosed, it will be appreciated that the term "activity" can be interpreted as any occupation or pursuit being undergone by a user, including the user undergoing various forms of motion and the user undergoing various social and environmental interactions during which the user's attention might be directed at different subjects.

The reader's attention is directed to all papers and documents which are filed concurrently with or previous to this specification in connection with this application and which are open to public inspection with this specification, and the contents of all such papers and documents are incorporated herein by reference.

All the features disclosed in this specification (including any accompanying claims, abstract and drawings), and/or all of the steps of any method or process so disclosed, can be combined in any combination, except combinations where at least some of such features and/or steps are mutually exclusive.

Each feature disclosed in this specification (including any accompanying claims, abstract and drawings), can be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A camera, comprising:
    a user interface for the input of information indicative of the activity of a user wherein said user interface comprises a user selection unit for the manual selection of at least one activity from a predetermined group of manually selectable activities;
    a control unit arranged to control at least one function of the camera in dependence upon said information; and
    a user activity determination unit arranged to estimate the activity of a user, the camera being arranged to utilize the estimated activity if, for a predetermined interval, said estimated activity differs from the manually selected activity indicated by the input information.

2. The camera as claimed in claim 1, wherein said control unit is arranged to store said information with at least one image captured by the camera for subsequent processing of said image.

3. The camera as claimed in claim 1, wherein said function comprises an image stabilization mode of the camera.

4. The camera as claimed in claim 1, wherein said function comprises an image capture mode of the camera.

5. The camera as claimed in claim 4, wherein said information is utilized to determine what images are captured and subsequently stored by the camera.

6. The camera as claimed in claim 1, wherein said information is indicative of at least one of the type of motion likely to be undergone by the user; the type of motion likely to be undergone by the camera; the attention of the user; the behavior of the user; and the surrounding environment.

7. The camera as claimed in claim 1, wherein said camera is a wearable camera.

8. A camera comprising:
a control unit arranged to control at least one function of the camera in dependence upon information indicative of a manual selection of an activity from among a plurality of manually selectable activities by user manual input from a user interface; and,
a user activity determination unit arranged to estimate the activity of a user, the camera being arranged to utilize the estimated activity if, for a predetermined interval, said estimated activity differs from the activity indicated by the input information.

9. A camera comprising:
a user interface for the manual selection of an activity from a selection of selectable activities and associated input of information indicative of at least one of a manually selectable motion of the user and a manually selectable motion of the camera;
a control unit arranged to control at least one function of the camera in dependence upon said information; and
a user activity determination unit arranged to estimate the activity of a user, the camera being arranged to utilize the estimated activity if, for a predetermined interval, said estimated activity differs from the manually selectable activity indicated by the input information.

10. A method of controlling a camera comprising the steps of:
causing a user of the camera to manually supply information to the camera indicative of a manual selection of manually selectable mode of activity of the user;
controlling at least one function of the camera as a function of said information;
estimating the activity of a user; and
utilizing the estimated activity if, for a predetermined interval, said estimated activity differs from the manually selected mode of activity indicated by the supplied information.

11. The method as claimed in claim 10, wherein each one of the activities in said group being associated with at least one predetermined parameter, the method further comprising the step of controlling said function of the camera by utilizing a parameter associated with the selected activity.

12. A non-transitory storage medium storing a computer program arranged to control a camera, the program being arranged to cause the camera to:
receive information manually input from a user indicative of a selection of an activity from a plurality of selectable activities by the user;
control at least one function of the camera in dependence upon said information;
estimate the activity of a user; and
utilize the estimated activity if, for a predetermined interval, said estimated activity differs from the activity indicated by the supplied information.

* * * * *

UNITED STATES PATENT AND TRADEMARK OFFICE
CERTIFICATE OF CORRECTION

| | | |
|---|---|---|
| PATENT NO. | : 7,969,496 B2 | Page 1 of 1 |
| APPLICATION NO. | : 10/426038 | |
| DATED | : June 28, 2011 | |
| INVENTOR(S) | : Maurizio Pilu | |

It is certified that error appears in the above-identified patent and that said Letters Patent is hereby corrected as shown below:

On the Title page, in field (75), Inventor, in column 1, line 1, delete "Maurizi Pilu," and insert -- Maurizio Pilu, --, therefor.

Signed and Sealed this
Third Day of April, 2012

David J. Kappos
*Director of the United States Patent and Trademark Office*